(12) United States Patent
Peters et al.

(10) Patent No.: US 12,521,811 B2
(45) Date of Patent: Jan. 13, 2026

(54) WELDING OR ADDITIVE MANUFACTURING SYSTEM WITH DISCONTINUOUS ELECTRODE FEEDING

(71) Applicant: Lincoln Global, Inc., Santa Fe Springs, CA (US)

(72) Inventors: Steven R. Peters, Huntsburg, OH (US); Judah B. Henry, Painesville, OH (US)

(73) Assignee: LINCOLN GLOBAL, INC., Santa Fe Springs, CA (US)

( * ) Notice: Subject to any disclaimer, the term of this patent is extended or adjusted under 35 U.S.C. 154(b) by 541 days.

(21) Appl. No.: 17/523,001

(22) Filed: Nov. 10, 2021

(65) Prior Publication Data
US 2023/0142671 A1 May 11, 2023

(51) Int. Cl.
*B23K 9/12* (2006.01)
*B22F 12/50* (2021.01)
(Continued)

(52) U.S. Cl.
CPC .............. *B23K 9/125* (2013.01); *B22F 12/50* (2021.01); *B23K 9/091* (2013.01); *B23K 9/0956* (2013.01); *B33Y 30/00* (2014.12); *B33Y 40/00* (2014.12)

(58) Field of Classification Search
CPC ...... B23K 9/125; B23K 9/091; B23K 9/0956; B23K 9/095; B23K 9/02; B23K 9/04;
(Continued)

(56) References Cited

U.S. PATENT DOCUMENTS

| 3,569,663 A | 3/1971 | Weman |
| 4,300,036 A | 11/1981 | Johansson |

(Continued)

FOREIGN PATENT DOCUMENTS

| EP | 0 139 249 B1 | 5/1990 |
| JP | 5200548 B2 | 7/2009 |
| RU | 2570145 C1 | 12/2015 |

OTHER PUBLICATIONS

Extended European Search Report from Corresponding Application No. EP22206148.3; Dated Apr. 11, 2023; pp. 1-9.

*Primary Examiner* — Helena Kosanovic
*Assistant Examiner* — Thao Uyen Tran-Le
(74) *Attorney, Agent, or Firm* — Brad C. Spencer

(57) ABSTRACT

A welding system includes a consumable electrode, torch, wire feeder, and power supply. The power supply is configured to provide a plurality of waveforms to the torch to generate a welding current in the electrode. Each of the plurality of waveforms includes a pinch current portion followed by an arcing current portion, and the pinch current portion is preceded by a first arc suppression portion and the arcing current portion is followed by a second arc suppression portion. An arc exists between the electrode and a workpiece during the arcing current portion, and an air gap without an arc exists between the consumable electrode and the workpiece during the arc suppression portions. The power supply is configured to detect a short between the electrode and workpiece and generate the pinch current portion when the short is detected, and the wire feeder stops feeding the electrode when the short is detected and restarts feeding the electrode after the short is clear.

22 Claims, 7 Drawing Sheets

(51) Int. Cl.
*B23K 9/09* (2006.01)
*B23K 9/095* (2006.01)
*B33Y 30/00* (2015.01)
*B33Y 40/00* (2020.01)

(58) Field of Classification Search
CPC ........ B23K 9/09; B23K 9/1012; B23K 9/173; B23K 9/133; B23K 9/32; B22F 12/50; B33Y 30/00; B33Y 40/00; B33Y 10/00
See application file for complete search history.

(56) References Cited

U.S. PATENT DOCUMENTS

| | | | |
|---|---|---|---|
| 5,528,010 A | 6/1996 | Herwig et al. | |
| 6,630,646 B1 | 10/2003 | Åberg et al. | |
| 7,339,135 B2* | 3/2008 | Uecker | B23K 9/133 219/124.01 |
| 8,809,735 B2 | 8/2014 | Kawamoto et al. | |
| 10,974,338 B2 | 4/2021 | Furuyama et al. | |
| 2006/0138115 A1* | 6/2006 | Norrish | B23K 9/091 219/137.71 |
| 2007/0119841 A1* | 5/2007 | Nakata | B23K 9/0671 219/137.71 |
| 2012/0000765 A1 | 1/2012 | Halloran | |
| 2015/0041449 A1* | 2/2015 | Fujiwara | B23K 9/073 219/130.21 |
| 2015/0151376 A1 | 6/2015 | Peters | |
| 2018/0214969 A1 | 8/2018 | Fleming et al. | |
| 2019/0022725 A1* | 1/2019 | Bauer | B05B 15/50 |
| 2019/0084068 A1* | 3/2019 | Furuyama | B23K 9/073 |
| 2022/0055135 A1* | 2/2022 | Satou | B23K 9/0953 |

* cited by examiner

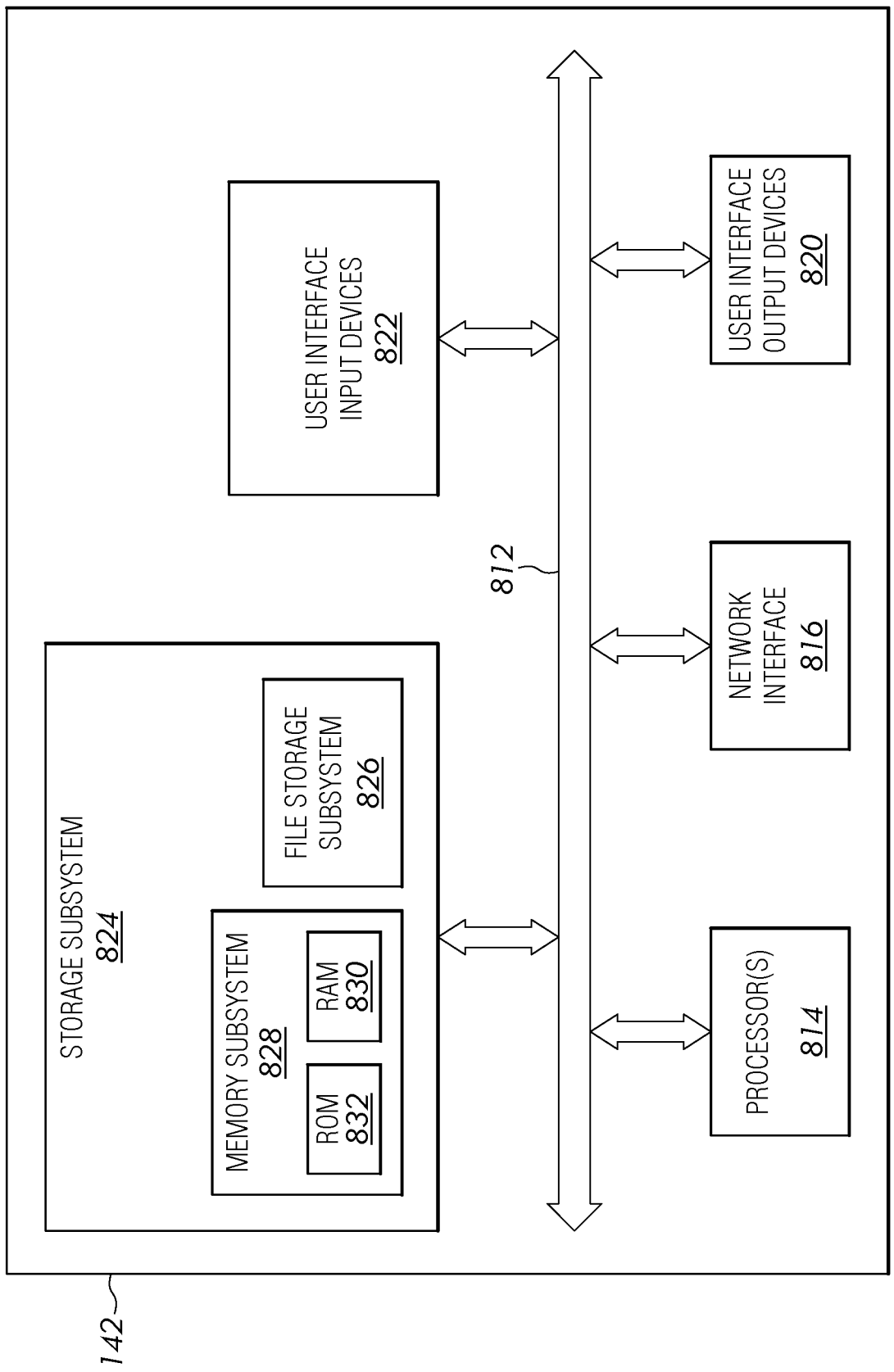

WELDING OR ADDITIVE MANUFACTURING SYSTEM WITH DISCONTINUOUS ELECTRODE FEEDING

BACKGROUND OF THE INVENTION

Field of the Invention

The present invention relates to arc welding and additive manufacturing systems and processes, and in particular to arc welding processes utilizing a driven consumable electrode.

Description of Related Art

Starting and stopping the electric arc in a conventional arc welding process can leave excessive and undesirable buildup of metal or voids along the weld joint. However, it would be desirable to deposit individual molten droplets to a workpiece, and suppress the arc between transferring the droplets, in order to accurately control droplet size and spacing and the transfer frequency, in particular during metal additive manufacturing.

BRIEF SUMMARY OF THE INVENTION

The following summary presents a simplified summary in order to provide a basic understanding of some aspects of the devices, systems and/or methods discussed herein. This summary is not an extensive overview of the devices, systems and/or methods discussed herein. It is not intended to identify critical elements or to delineate the scope of such devices, systems and/or methods. Its sole purpose is to present some concepts in a simplified form as a prelude to the more detailed description that is presented later.

In accordance with one aspect of the present invention, provided is a welding or additive manufacturing system. The system includes a consumable electrode, a torch, a wire feeder that selectively feeds the consumable electrode through the torch during a deposition operation, and a welding power supply operatively connected to the wire feeder and the torch. The welding power supply is configured to provide a plurality of welding waveforms to the torch to generate a welding current in the consumable electrode. Each of the plurality of welding waveforms includes a pinch current portion followed by an arcing current portion, and the pinch current portion is preceded by a first arc suppression portion and the arcing current portion is followed by a second arc suppression portion. An arc exists between the consumable electrode and a workpiece during the arcing current portion, and an air gap without an arc exists between the consumable electrode and the workpiece during the first arc suppression portion and the second arc suppression portion. The welding power supply is configured to detect a short circuit between the consumable electrode and workpiece and generate the pinch current portion when the short circuit is detected, and the wire feeder stops feeding of the consumable electrode when the short circuit is detected and restarts feeding of the consumable electrode after the short circuit is cleared.

In accordance with another aspect of the present invention, provided is a welding or additive manufacturing system. The system includes a consumable electrode, a torch, a wire feeder that selectively feeds the consumable electrode through the torch during a deposition operation, and a welding power supply operatively connected to the wire feeder and the torch. The welding power supply is configured to provide a plurality of welding waveforms to the torch to generate a welding current in the consumable electrode. Each of the plurality of welding waveforms includes a pinch current portion followed by an arcing current portion, and the pinch current portion is preceded by a first arc suppression portion and the arcing current portion is followed by a second arc suppression portion. An arc exists between the consumable electrode and a workpiece during the arcing current portion, and an air gap without an arc exists between the consumable electrode and the workpiece during the first arc suppression portion and the second arc suppression portion. The welding power supply is configured to detect a short circuit between the consumable electrode and workpiece and generate the pinch current portion when the short circuit is detected, and the wire feeder stops feeding of the wire electrode during the pinch current portion and restarts feeding of the wire electrode during the second arc suppression portion.

In accordance with another aspect of the present invention, provided is a welding or additive manufacturing system. The system includes a consumable electrode, a torch, a wire feeder comprising a plurality of drive rolls that selectively feed the consumable electrode through the torch during a deposition operation, and a power supply operatively connected to the wire feeder and the torch. The power supply is configured to provide a plurality of welding waveforms to the torch to generate a welding current in the consumable electrode. Each of the plurality of welding waveforms includes a pinch current portion followed by an arcing current portion, and the pinch current portion is preceded by a first arc suppression portion and the arcing current portion is followed by a second arc suppression portion. An arc exists between the consumable electrode and a workpiece during the arcing current portion, and an air gap without an arc exists between the consumable electrode and the workpiece during the first arc suppression portion and the second arc suppression portion. The welding power supply is configured to detect a short circuit between the consumable electrode and workpiece and generate the pinch current portion when the short circuit is detected, and the wire feeder stops operation of the plurality of drive rolls after the short circuit is detected and restarts operation of the plurality of drive rolls subsequent to the pinch current portion being supplied to the torch.

BRIEF DESCRIPTION OF THE DRAWINGS

The foregoing and other aspects of the invention will become apparent to those skilled in the art to which the invention relates upon reading the following description with reference to the accompanying drawings, in which:

FIG. 7 is a block diagram of an example controller.

DETAILED DESCRIPTION OF THE INVENTION

Figure 1:
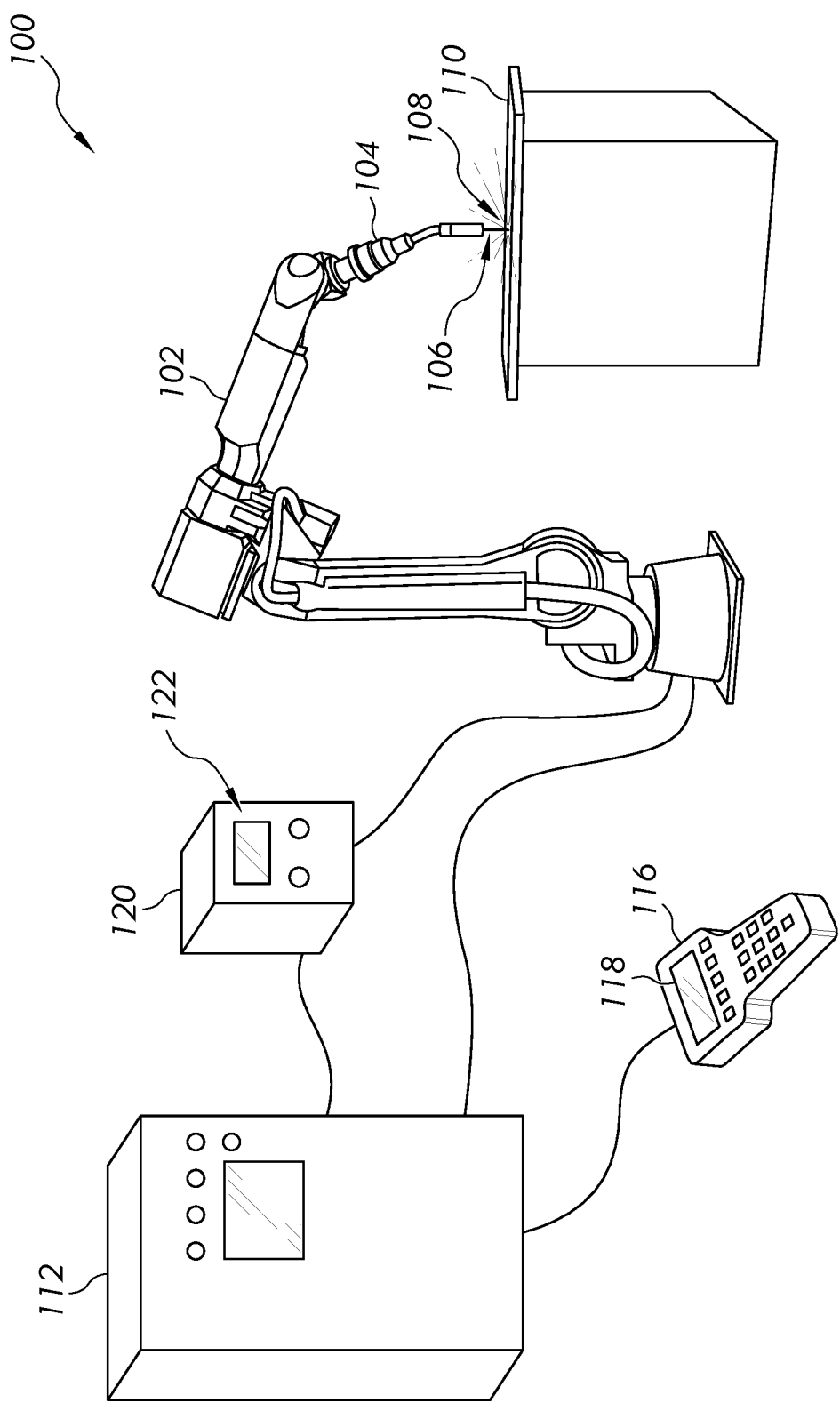
FIG. 1 shows an arc welding system.

The present invention relates to arc welding and additive manufacturing systems and processes that utilize a driven consumable electrode, and in particular to such systems and processes in which the consumable electrode is not driven continuously during the deposition operation. The present invention will now be described with reference to the drawings, wherein like reference numerals are used to refer to like elements throughout. It is to be appreciated that the various drawings are not necessarily drawn to scale from one figure to another nor inside a given figure, and in particular that the size of the components are arbitrarily drawn for facilitating the understanding of the drawings. In the following description, for purposes of explanation, numerous specific details are set forth in order to provide a thorough understanding of the present invention. It may be evident, however, that the present invention can be practiced without these specific details. Additionally, other embodiments of the invention are possible and the invention is capable of being practiced and carried out in ways other than as described. The terminology and phraseology used in describing the invention is employed for the purpose of promoting an understanding of the invention and should not be taken as limiting.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. Any disjunctive word or phrase presenting two or more alternative terms, whether in the description of embodiments, claims, or drawings, should be understood to contemplate the possibilities of including one of the terms, either of the terms, or both terms. For example, the phrase "A or B" should be understood to include the possibilities of "A" or "B" or "A and B."

While embodiments of the present invention described herein are discussed in the context of a gas metal arc welding (GMAW) system, other embodiments of the invention are not limited thereto. For example, embodiments can be utilized in flux-cored arc welding (FCAW), metal-cored arc welding (MCAW), submerged arc welding (SAW), gas tungsten arc welding (GTAW) as well as other similar types of welding operations. Further, embodiments of the present invention can be used in manual, semi-automatic and robotic welding operations. Embodiments of the present invention can also be used in metal deposition operations that are similar to welding, such as additive manufacturing, hardfacing, and cladding. As used herein, the term "welding" is intended to encompass all of these technologies as they all involve material deposition to either join or build up a workpiece. Therefore, in the interests of efficiency, the term "welding" is used below in the description of exemplary embodiments, but is intended to include all of these material deposition operations, whether or not joining of multiple workpieces occurs.

FIG. 1 shows an example arc welding system 100. The welding system 100 includes a robot 102 that operates an electric arc torch or welding torch 104. The robot 102 can be a six-axis articulating industrial robot, or another type of robot, such as an orbital pipe welder for example. However, the welding system 100 need not include a robot 102 and could be a manual welding system in which the welding torch 104 is operated by a person.

The torch 104 can include an electrode 106, such as a consumable wire electrode, through which an arc 108 is generated between the torch and a workpiece 110 to perform a welding operation on the workpiece. The robot 102 controls the movements of the torch 104 during welding to perform a programmed welding or additive manufacturing operation on the workpiece 110. The robot 102 controls the movements of the torch 104 during welding based on control instructions received from a computer-based robot controller 112. The robot controller 112 can be operatively connected to a welding power supply 120 for bidirectional communications therewith. The robot controller 112 and welding power supply 120 can communicate operating information and parameter settings to coordinate movements of the robot 102 with the state of the arc during welding of the workpiece 110. In certain embodiments, the robot controller 112 can set or adjust parameters in the welding power supply 120, and the power supply can set or adjust parameters in the robot controller. The robot controller 112 can include a handheld control pendant 116 or teach pendant operatively connected to the robot controller. The control pendant 116 includes a user interface 118 having a display and various user inputs. Using the control pendant 116, an operator can program or adjust various operations to be performed by the robot 102. The operator can also view on a display of the user interface 118 information about the robot 102 and information about the operation the robot performs on the workpiece 110 using the torch 106.

The welding power supply 120 is operatively connected to the torch 104 and provides an electrical power output as a plurality of welding waveforms to the torch 104 to generate a welding current in the consumable electrode and generate the arc 108. The welding power supply 120 converts input electrical power (e.g., utility power) into a suitable arc welding waveform for performing a welding or additive manufacturing operation on the workpiece 110. The welding power supply 120 can include electronic circuitry (e.g., PWM inverters, choppers, etc.) for generating a desired welding waveform. The welding power supply 120 can further include a processor, memory, and a user interface 122 for adjusting various parameters of the welding operation performed on the workpiece 110 (e.g., voltage, current, wire feed speed, AC balance, etc.) and for controlling the welding waveform during welding.

Figure 2:
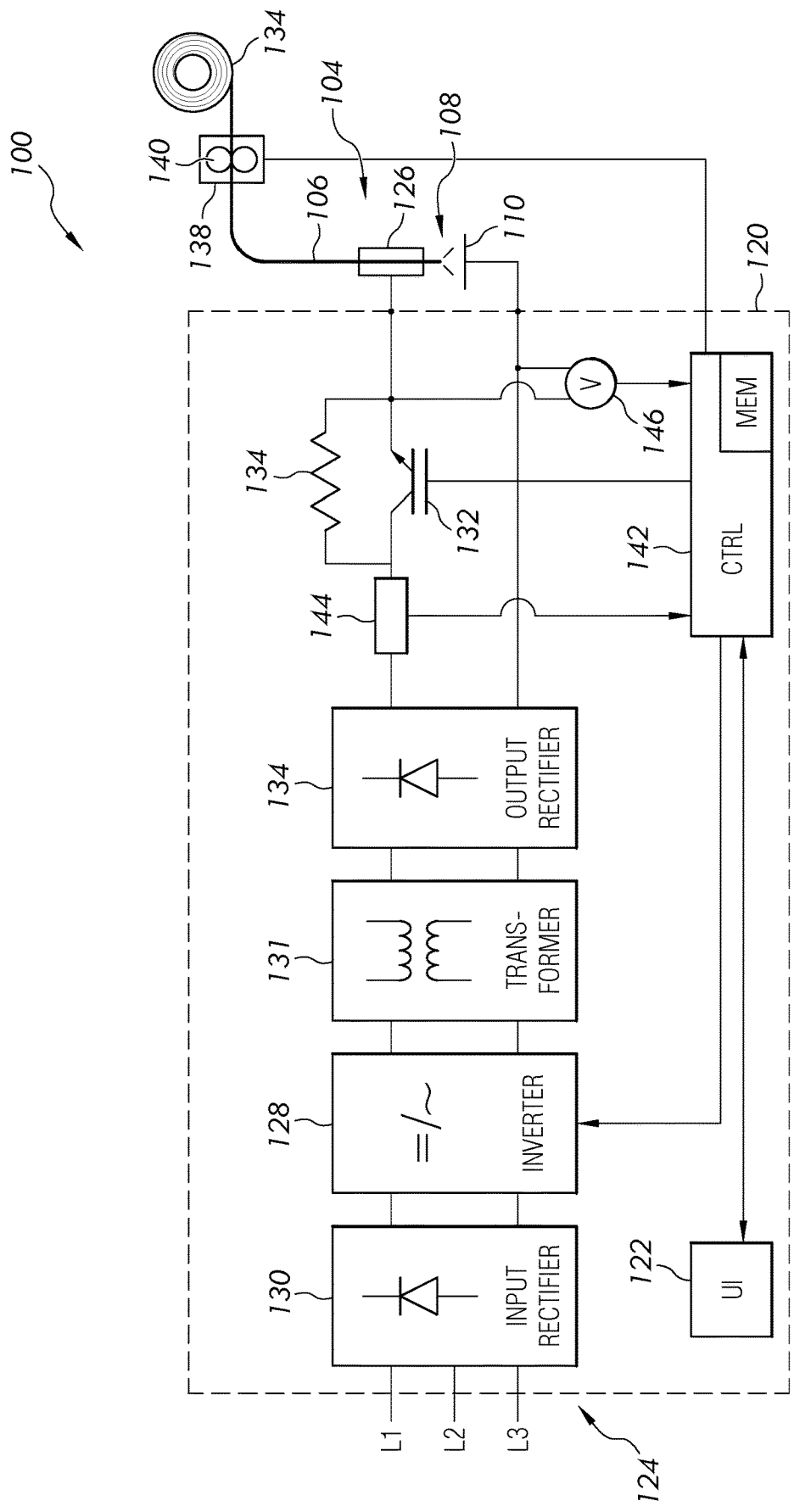
FIG. 2 is a block diagram of the arc welding system.

FIG. 2 shows a schematic block diagram of the arc welding system 100. The power supply 120 receives electrical energy for generating the arc 108 from a power source 124, such as a commercial power source or a generator. The power source 124 can be a single phase or three phase power source. In certain embodiments, the arc welding system 100 can be a hybrid system that includes one or more batteries (not shown) that also supply energy to the welding power supply 120. The power supply 120 includes output circuitry for supplying the welding waveforms to a contact tip 126 in the torch 104 and to the consumable wire electrode 106 through the contact tip 126. The output circuitry can include a switching type power converter such as an inverter 128 for generating the arc 108 according to a desired welding waveform. Alternatively or additionally, the welding power supply could include a DC chopper (not shown) or boost converter (not shown) for generating welding waveforms. AC power from the power source 124 is rectified by an input rectifier 130. The DC output from the rectifier 130 is supplied to the inverter 128. The inverter 128 supplies high-frequency AC power to a transformer 131, and the output of the transformer is converted back to DC by an output rectifier 134.

Current from the output circuitry flows to the contact tip 126 and to the electrode 106 and workpiece 110 to generate the arc 108. The welding current from the output rectifier 134 can flow through either a controllable output switch 132 or a resistor 134. Deactivating the output switch 132 will quickly reduce the welding current by forcing it through the resistor 134. The output switch 132 and resistor 134 can be used to reduce spatter at specific points during welding by quickly reducing the welding current. For example, when conducting a surface tension transfer STT or a short-arc welding operation, the welding current can be rapidly brought to a low current level when a short circuit event between the welding electrode 106 and workpiece 110 occurs and/or is about to break, by selectively deactivating the output switch 132. It can be seen that the resistor 134 is connected in parallel with the output switch 132. When the output switch 132 is in the on or activated state, the welding current flows through the output switch to the torch 104 and electrode 106. When in the on state, the output switch 132 effectively shorts out the resistor 134. When the output switch 132 is in an off or deactivated state, the resistor 134 is connected in series with the torch 104 and electrode 106, and the welding current flows through the resistor. In certain embodiments, the resistor 134 can be adjustable to control the magnitude of the low current level.

The welding torch 104 is operatively connected to the power supply 120. The power supply 120 supplies welding output electrical energy to the welding torch 104 to generate the arc 108 and perform the deposition operation (e.g., welding, additive manufacturing, hardfacing, etc.) The torch 104 can have a contact tip 126 for transferring the electrical energy supplied by the power supply 120 to the electrode 106. The electrode 106 can be a solid, flux-cored or metal-cored consumable wire welding electrode. The electrode 106 can be fed from a welding wire source 134 by a wire feeder 138, which advances the electrode toward a weld puddle during the welding operation. Example welding wire sources 134 include spools and drums that store a coil of welding wire. The wire feeder 138 can include a plurality of drive rolls 140 which are motor-operated pinch rollers for driving the electrode 106 toward the torch 104. The welding power supply 120 can be operatively connected to the wire feeder 138 to supply the welding waveforms to the torch 104 through the wire feeder. The welding power supply 120 can also control the operations of the wire feeder 138 during the deposition operation. In particular, the welding power supply 120 can provide instructions or control signals to the wire feeder 138 to cause the wire feeder to stop feeding the electrode 106 during certain portions of the welding waveform (e.g., after a molten droplet is transferred to the weld pool) and then restart feeding the electrode to resume the deposition operation. Molten droplet transfer and stopping and restarting the wire feeder 138 during the deposition operation is discussed further below. In certain embodiments, the wire feeder 138 and the welding power supply 120 can communicate bidirectionally over dedicated control cables, over the welding circuit itself, or wirelessly.

The arc welding system 100 can be configured for direct current electrode positive (DC+) or "reverse" polarity wherein the contact tip 126 and electrode 106 are connected to a positive lead from the power supply 120, and the workpiece 110 is connected to a negative lead. Alternatively, the arc welding system 100 can be configured for direct current electrode negative (DC−) or "straight" polarity, wherein the workpiece 110 is connected to the positive lead and the contact tip 126 and electrode 106 are connected to the negative lead. Further, the arc welding system 100 can be configured for AC welding in which AC waveforms are provided to the contact tip 126, electrode 106 and workpiece 110.

The power supply 120 includes a controller 142 operatively connected to the output circuitry, such as to the inverter 128, for controlling the welding waveforms generated by the power supply. The controller 142 can provide a waveform control signal to the inverter 128 to control its output. The controller 142 controls the output of the inverter 128 via the waveform control signal, to achieve a desired welding waveform, welding voltage, welding current, etc. The waveform control signal can comprise a plurality of separate control signals for controlling the operation of various switches (e.g., transistor switches) within the inverter 128. The controller 142 and the user interface 122 communicate bidirectionally to provide both user inputs and outputs at the user interface. The controller 142 is also operatively connected to the output switch 132 to control its switching operations between the on, activated state and the off, deactivated state. The controller 142 monitors aspects of the welding process via feedback signals. For example, a current sensor 144, such as a current transformer (CT) or shunt, can provide a welding current feedback signal to the controller 142, and a voltage sensor 146 can provide a welding voltage feedback signal to the controller. During the arc welding operation, the current sensor 144 measures the welding current level and the voltage sensor 146 measures the welding voltage level, and both of these measured levels are provided to the controller 142 as feedback.

The controller 142 can be an electronic controller and may include a processor. The controller 142 can include one or more of a microprocessor, a microcontroller, a digital signal processor (DSP), an application specific integrated circuit (ASIC), a field-programmable gate array (FPGA), discrete logic circuitry, or the like. The controller 142 can include a memory portion (e.g., RAM or ROM) storing program instructions that cause the controller to provide the functionality ascribed to it herein. The controller 142 can include a plurality of physically separate circuits or electronic devices, such as a processor in combination with separate comparators, logic circuits, etc. However, for ease of explanation, the controller 142 is shown as a monolithic device.

As noted above, starting and stopping the electric arc in a conventional arc welding process can leave excessive and undesirable buildup of metal or voids along the weld joint. In conventional short circuit welding in which molten droplets are transferred to the weld pool by shorting the electrode to the weld pool, and in retract wire processes, current flow is maintained between droplet transfers. However, it would be desirable to deposit individual molten droplets to a workpiece via a short circuit, and to suppress the arc (i.e., stopping the arc current flow between the electrode and the workpiece) between transferring the droplets, in order to accurately control droplet size and spacing and control the droplet transfer frequency, in particular during metal additive manufacturing. In conjunction with transferring the droplet via a short circuit and subsequently suppressing the arc, the wire feeder can also be stopped for a desired duration as part of controlling the transfer frequency. The welding system 100 described above is programmed, such as via state tables, to deposit molten droplets onto the workpiece one by one, with arc suppression occurring and wire feeding being paused between droplet transfers. Such a transfer mechanism can be likened to a dot matrix printer that prints shapes via a plurality of individual dots. The welding system 100 is configured to perform dot matrix welding or dot matrix metal deposition by depositing molten droplets with controllable size and frequency and with the welding current paused between droplet transfers. Like a dot matrix printer, dot matrix welding deposits one droplet at a time from the consumable wire electrode 106 to the workpiece 110. Upon completion of the transfer of the droplet, heat in the form of an electric arc 108 is added to establish a weld pool and ensure that the droplet adheres to the workpiece 110. The amplitude and duration of the arc heat applied can be adjusted, such as based on the particular application and/or thickness of the workpiece 110. Once the desired arc heat is applied, the process is temporarily shut off to wait until the next droplet transfers.

Figure 3:
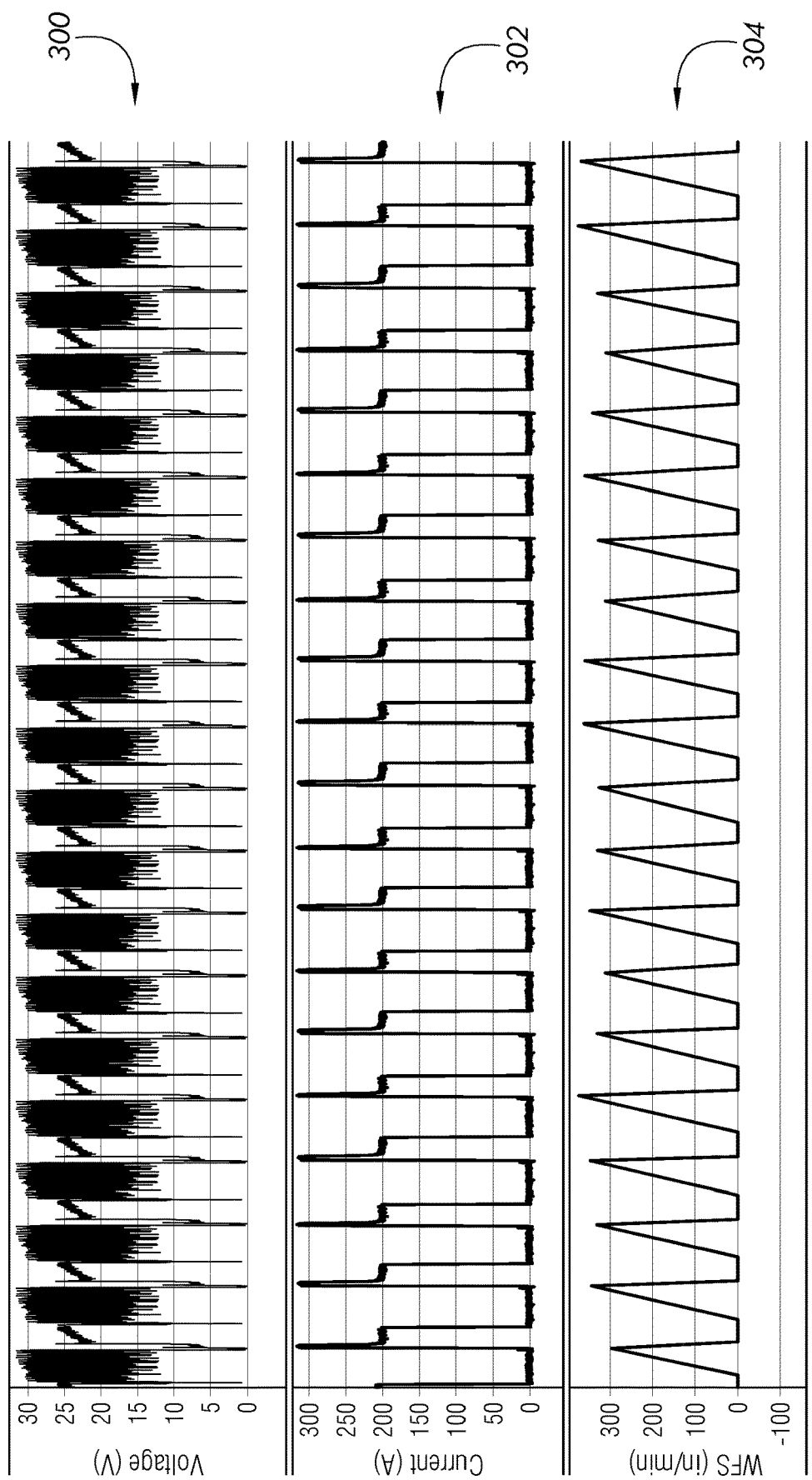
FIG. 3 shows example welding waveforms and wire feed speed.
Figure 4:
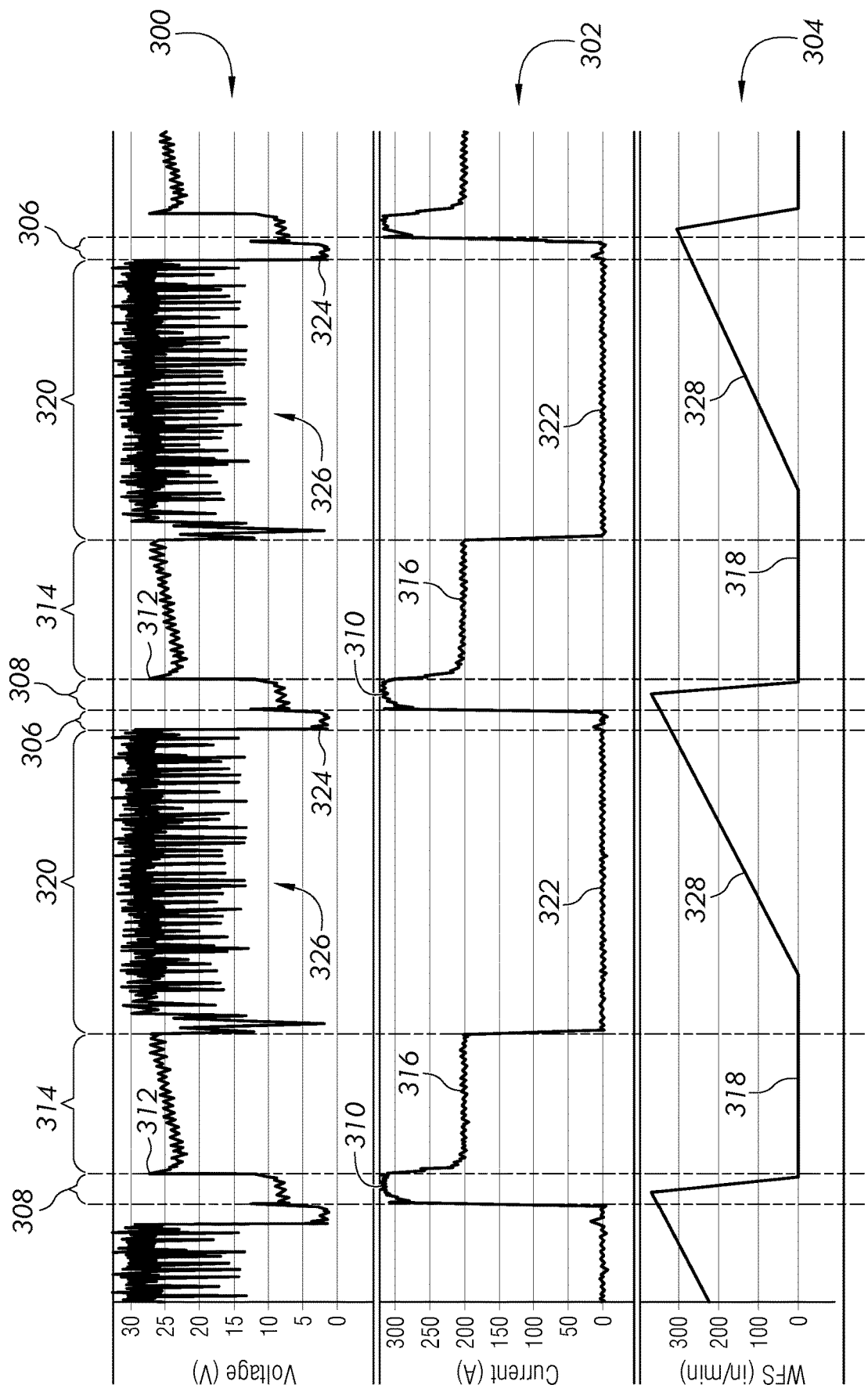
FIG. 4 shows example welding waveforms and wire feed speed.

FIGS. 3 and 4 illustrate example voltage, current and wire feed speed waveforms of the dot matrix deposition operation. The illustrated welding waveforms are merely exemplary and can be modified in various ways, such as by adjusting amplitudes, durations and timings of the different portion of the waveforms as discussed below. The upper trace 300 shows the welding voltage waveform. The middle trace 302 shows the welding current waveform. The lower trace 304 shows the wire feed speed (WFS) during the welding operation. FIG. 3 shows the welding voltage 300, current 302, and WFS 304 waveforms over a number of periods (e.g., 20 periods) with each period transferring one molten droplet to the weld pool and pausing the wire feeding and suppressing the welding arc (e.g., by shutting off the arc current). FIG. 4 shows a more detailed view of the voltage 300, current 302, and WFS waveforms.

The consumable wire electrode is fed toward the workpiece by the wire feeder until it shorts to the workpiece or molten weld pool. The short circuit is detected by the welding power supply by monitoring the welding voltage level. When the welding voltage level falls to a short circuit level 324, the welding power supply recognizes that the short circuit has occurred. Short circuit portions 306 of the welding waveforms are identified in FIG. 4. It can be seen that the welding voltage level rapidly drops from an average open circuit level of about 25 V, for example, to 0 V when the consumable electrode shorts to the workpiece/weld pool. The short circuit between the consumable electrode 106 and workpiece 110 during the short circuit portion 306 of the welding waveforms is shown schematically in FIG. 5.

Upon detecting the short circuit, the welding power supply generates a pinch current portion 308 of the welding waveforms to pinch off the short circuit and transfer the molten droplet to the workpiece. The welding power supply generates a current pulse 310 during the pinch current portions 308 that pinches off the molten droplet from the electrode. The current pulse 310 can be triggered upon the power supply detecting the short circuit, or after a short delay after the occurrence of the short circuit to allow the molten droplet to completely connect to the weld pool. The current pulse 310 can last until the molten droplet separates from the electrode, which is detected by the welding power supply as a voltage rise 312. The pinch current pulse shown in FIG. 4 is approximately 300 A, however other current levels could be used as appropriate or desired. Although there is a substantial amount of current during the pinch current portion 308, there is practically no voltage level and, therefore, little power is added while the molten droplet is deposited. The duration of the pinch current portion 308 is a reaction to the conditions of the system, and the current pulse 310 is present as long as the consumable electrode is short circuited to the workpiece. It can be seen that the duration of the current pulse 310 is short relative to the overall period of the repeating waveforms, and that the molten droplet transfers quickly indicting the process is stable. The pinch current portion 308 is shown schematically in FIG. 5, with the molten droplet necking down and pinching off into the weld pool. During the pinch current portion 308, the wire feeder 138 (FIG. 2) is shut off and stops feeding the consumable electrode into the weld pool, to reduce the pressure placed on the droplet transfer due to feeding more material into it. As the WFS trace 304 shows, the wire feeder and wire electrode does not reverse, but allows the electro-magnetic pinch force to transfer metal from the electrode to the workpiece. The wire feeder can be stopped by the welding power supply via a command signal to the wire feeder. For example, the welding power supply can detect the short circuit between the electrode and the workpiece and stop the wire feeder. Alternatively, the wire feeder can detect the short circuit and stop feeding the electrode. The wire feeder can be stopped when or just after the short circuit 324 is detected, during the pinch current portion 308, or its stopping can be timed to the generation of the pinch current pulse 310 for example. In FIGS. 3 and 4, the wire feeder is stopped by the welding power supply when it detects the short circuit between the wire electrode and workpiece; however, there is a slight communications delay between the power supply and wire feeder, which results in the wire feeder stopping during the pinch current pulse 310. The wire feeder 138 (FIG. 2) stops and restarts feeding of the consumable electrode 106 by controlling the operation of its drive rolls 140, as would be appreciated by one of ordinary skill in the art.

Figure 5:
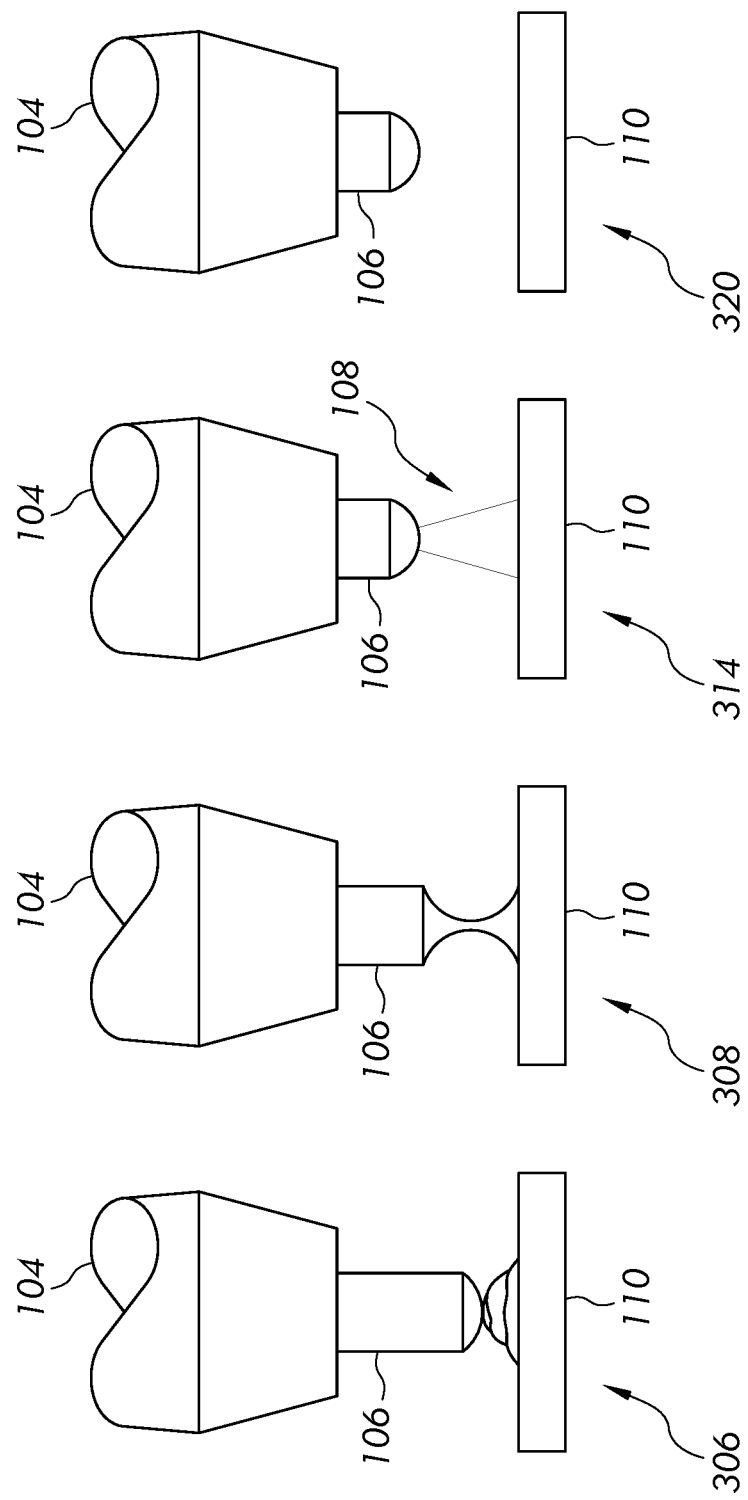
FIG. 5 schematically shows an arc deposition operation.

The pinch current portion 308 of the welding waveforms is followed by an arcing current portion 314. The welding power supply generates the arcing current portion 314 upon detecting voltage rise 312, which indicates that the molten droplet has separated from the electrode. The arc 108 exists between the electrode 106 and workpiece 110 during the arcing current portion 314, as shown in FIG. 5. The arcing current 316 level is about 200 A in FIGS. 3 and 4, however other current levels could be used as appropriate or desired (e.g., based on a desired amount of arc heating). The current pulse 310 level is greater than the arcing current 316 level in the example embodiment shown. However, the current pulse 310 level could be equal to the arcing current 316 level or less than the arcing current level if desired. Once the molten droplet transfers to the workpiece 110, flowing current continues during the arcing current portion 314. The arc 108 heats the droplet that just transferred. The heat of the arc 108 wets the droplet into the workpiece 110. The heat of the arc 108 also creates a new droplet on the end of the electrode 106 and creates separation between the workpiece 110 and the electrode. An example duration for the arcing current portion 314 shown in FIGS. 3 and 4 is 10 ms, although shorter or longer durations are possible depending on the amount of arc heating that is desired. The duration of the arcing current portion 314 is a fixed duration and can be based on the amount of heat that is desired to be added to the weld pool and the amount of desired separation between the electrode 106 and workpiece 110 (e.g., desired burn back). For thin workpieces, the arcing current 316 level and the duration of the arcing current portion 314 can be reduced. Stable operation is possible with an arcing current portion 314 lasting 3 to 5 ms and with an arcing current 316 level of 50 A. The size of the molten droplet that is created on the end of the consumable electrode can be adjusted based on both of a current magnitude and duration of the arcing current portion 314. The wire feeder can remain stopped during the arcing current portion 314, as shown in FIGS. 3 and 4. It can be seen that the WFS level 318 is 0 inches per minute during the arcing current portion 314. Keeping the wire feeder stopped reduces any pressure that would be applied to the molten weld pool by the feeding wire.

However, if desired, feeding of the consumable electrode 106 could be resumed any time after the short is cleared, such as during the arcing current portion 314. Restarting the wire feeder during the arcing current portion 314 will have a limited affect (e.g., slightly reduce) the separation of the electrode 106, or burn back of the electrode, from the workpiece 110. The wire feeder could also be restarted at the beginning of the arcing current portion 314, when the short circuit between the electrode 106 and workpiece 110 is cleared and the molten droplet has separated from the electrode. In certain embodiments, the controller 142 (FIG. 2) in the welding power supply includes a timer that is activated at the start of the arcing current portion 314 and the timer determines when the wire feeder is restarted to resume feeding the electrode 106 based on a programmed duration. The duration or restart time provided by the timer could occur during the arcing current portion 314 or after the arcing current portion ends.

Following the arcing current portion 314 of the welding waveforms is an arc suppression portion 320. The arc is suppressed by the welding power supply by turning off the welding current (e.g., turning off the transistor switches in the inverter). The welding current 322 level is 0 A during the arc suppression portion 320, and there is no welding arc during the arc suppression portion 320, as shown in FIG. 5. It can be seen in FIG. 5 that an air gap without an arc exists between the consumable electrode 106 and the workpiece 110 during the arc suppression portion 320. Although there is no current flow between the electrode 106 and workpiece 110 during the arc suppression portion 320 of the welding waveforms, an open circuit voltage 326 between them exists so that the welding power supply can detect when the next short circuit occurs. The arc suppression portion 320 precedes the short circuit portion 306 and the following pinch current portion 308 of the next welding waveform and stops the heating of the weld pool and electrode that occurs during the arcing current portion 314. The arc suppression portion 320 exists until the next short circuit occurs and the duration of the arc suppression portion can be longer than the duration of the arcing current portion 314.

In the example embodiment of FIGS. 3 and 4, the wire feeder restarts and resumes feeding the consumable wire electrode toward the workpiece during the arc suppression portion 320. The wire feeder can be restarted after a brief delay (e.g., between 5 and 20 ms) after the start of the arc suppression portion 320. The WFS is ramped 328 upward until the next short circuit occurs. However, the WFS need not be ramped or have a constant acceleration but could be set to a fixed desired speed. An additional molten droplet will be transferred when the next short circuit occurs by driving the electrode to the workpiece and applying another pinch current pulse 310. The frequency of droplet transfer depends on the delay between the start of the short circuit between the electrode and workpiece and the restarting of the wire feeder, and the separation of the wire from the weld pool. The ramp rate 328 of the WFS will also have some impact on the frequency of droplet transfer. It is to be appreciated that the frequency of droplet transfer can be controlled by adjusting the various parameters discussed above, such as the duration of the arcing current portion 314, the duration of the arc suppression portion 320, and the timing of restarting the wire feeder. For example, restarting the wire feeder during the arcing current portion 314, rather than during the arc suppression portion 320, increases the frequency of droplet transfer and increases the deposition rate. A high droplet transfer frequency and deposition rate may be desirable for thicker workpieces. The droplet transfer frequency can be reduced for thinner workpieces to reduce the likelihood of burn through. Although in the illustrated example embodiments the feeding direction of the wire electrode is not reversed, it could be reversed if desired, such as after the short circuit is detected or during the arc suppression portion 320. In certain embodiments, stubbing of the wire electrode to the weld pool/workpiece can be detected and the wire feeding reversed if stubbing is detected (to pull the wire from the weld pool).

An example welding system configuration utilizing the waveforms shown in FIGS. 3 and 4 can include the use of 90/10 (90% argon, 10% CO2) shielding gas. The size of the consumable welding electrode can be 0.045 inches in diameter, and the average WFS can be approximately 100 inches per minute. The frequency of molten droplet transfer in FIGS. 3 and 4 is approximately 33 Hz, and the duration of the arcing current portion 314 is approximately 10 ms.

During automated (e.g., robotic) welding the travel speed of the torch can be controlled based on the frequency of droplet transfer. If the droplet transfer frequency is high, then the travel speed of the torch can be increased. An advantage of the dot matrix deposition operation discussed above is that directional changes in torch movement are facilitated by the periodic interruption of metal transfer and the extinguishing of the arc.

Figure 6:
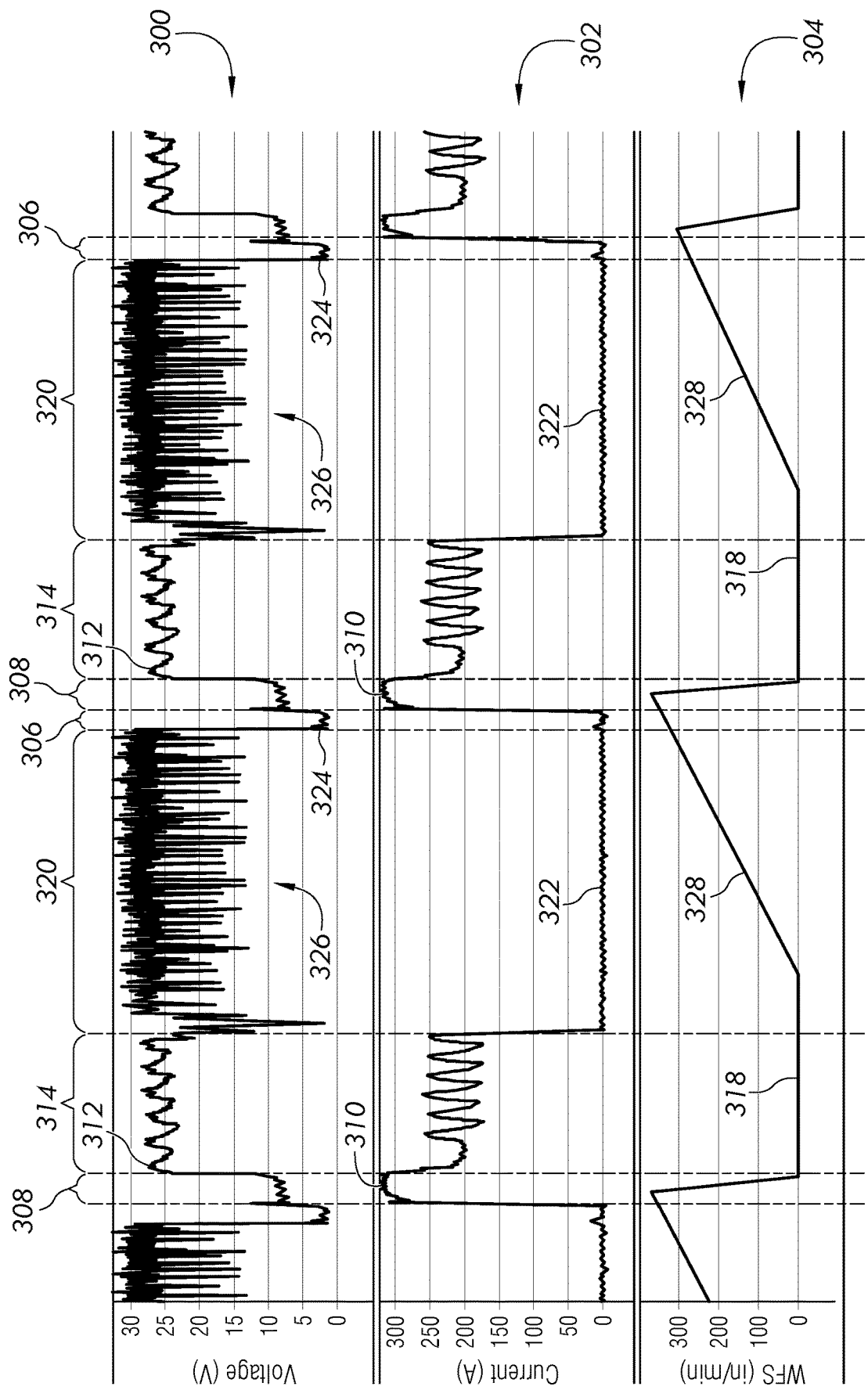
FIG. 6 shows example welding waveforms and wire feed speed.

FIG. 6 illustrates further example welding waveforms and wire feed speed of the dot matrix deposition operation. The arcing current portion 314 can include a plurality of current pulses rather than a generally constant arcing current level, as shown in FIG. 4. The current level of the current pulses can be controlled by the welding power supply, and/or the current pulses can be controlled to provide a desired power level or energy input during the arcing current portion 314. An advantage provided by controlling the power level during the arcing current portion 314 is that changes to arc length can be accommodated automatically by adjusting the current level to maintain the desired power level. By pulsing the current during the arcing current portion 314 as shown, the arc column becomes more focused by the increased magnetic fields of the peak current. The arc will be focused upon a smaller spot on the weld puddle as compared to the arcing current portion in FIG. 4. A more focused arc can allow for a faster travel speed during the deposition operation, and the molten deposit, following the focused heat of the arc, tends to stay where it is placed. The power level or energy input during the arcing current portions 314 shown in FIGS. 4 and 6 can be substantially the same despite the differences in the shapes of the respective current waveforms; however, various current and power levels can be provided as desired. An example frequency range for the current pulses during the arcing current portion 314 is at least 400 Hz (e.g., 400 Hz, 450 Hz, 480 Hz, 500 Hz, greater than 500 Hz, etc.), although frequencies below 400 Hz could be used to provide a desired arc focus.

The welding system discussed above can be used to weld galvanized steel. Typically when welding galvanized steel, porosity within the weld joint is caused by vaporizing zinc outgassing through the solidifying weld pool. Welding over galvanized coatings often results in an unstable arc characteristic forming excessive spatter. Dot matrix welding on thin, hot dipped galvanized plated was found to be stable with no porosity. The system setup included the use of a 0.045 inch diameter steel wire shielded under CO2 traveling at 35 inches per minute (ipm). The target WFS was 400 ipm and the current level 316 of the arcing current portion 314 was 125 amps. The duration of the arcing current portion 314 was 7 ms. The wire feeder was restarted half way through the arcing current portion 314 to increase droplet transfer frequency thus improving the travel speed.

The GMAW process links the heat of the process to the deposit rate. Welding pipe requires a wide range of heat control to address the various problems experienced in all position operation. When welding root passes on pipe, gravity at the top of the pipe wants to pull weld metal through the joint while at the bottom of the pipe, the process must push the weld metal into the joint against gravity. The dot matrix deposition operation discussed above separates the transfer of molten droplets from the heating (arcing) portion of the deposition operation, allowing the operator a wide range of heat input required by pipe welding. When making narrow groove welds, arc wander occurs when the arc starts to prefer the sidewall of the joint instead of the root. As the heat of the arc is pushed sideways by lower resistivity or magnetism, weld metal is drawn to the area heated by the arc, creating defects. The dot matrix deposition operation has no arc while the wire is feeding forward and during the droplet transfer stage. The wire touches where the torch tip points it and the heating portion is forced to that point at the time when the arc length is very short.

The deposition operation discussed above may limit or reduce the tendency of the arc to wander from the weld joint. Certain welding operations (e.g., silicon bronze welding thin materials) require precise placement of the weld material in the weld joint. The dot matrix deposition operation discussed above reestablishes the arc after droplet transfer, at the site where the wire feeder places the electrode. Stopping and restarting the arc can limit the tendency of the arc to wander from its intended location.

When cladding with stainless steel, nickel alloys, or copper nickel alloys, excessive admixture of conventional processes forces fabricators to slow down or use other less productive processes. The dot matrix metal deposition operation discussed above offers very low heat input for reduction of admixture. The heat is applied just after droplet transfer and that heat is precisely controlled and is independent of droplet frequency.

In conventional welding operations, when the wire runs out or no longer feeds, the arc runs up the wire and destroys the contact tip. The dot matrix welding operation discussed above suppresses the arc every cycle or waveform period then attempts to feed the wire back to the surface of the workpiece. If the wire cannot feed due to the supply running out or other reason, contact or short circuiting will not occur and the arc will not burn back to the tip. The amount of heat applied during the arcing current portion 314 already depends that the wire is not feeding. Only the desired separation occurs even if the wire supply runs out.

The dot matrix welding operation can be combined with conventional welding operations in which the weld current is not suppressed during metal deposition. For example, a deposition operation can be performed that includes both dot matrix deposition (e.g., deposition with arc suppression and optional wire feeding stopping and restarting) and conventional short circuit transfer, spray transfer and/or pulsed spray transfer.

The arc welding system 100 shown in FIG. 1 could include two or more torches 104 that operate together to perform a welding or additive manufacturing operation. Deposition by the torches could be synchronized by the delay between arc suppression and wire feed restart. A feeder could be commanded to restart when the short circuit in another system breaks. Wire feeding by one welding system could occur during the arcing current portion of another welding system, and their arcs could alternate.

When starting conventional welding operations, if the wire electrode does not strike the workpiece or weld pool or if it hits a silicon island, the wire feeder will continue to feed the wire and the wire will arc off the fixture, turning bright red with a burn potential if it hits an operator. The dot matrix welding operation can have the knowledge of the length of wire fed during open circuit voltage (e.g., during the arc suppression portion 320). This occurs at the initial starting of a conventional process and in between each droplet of the dot matrix operation. If that length of wire exceeds a preset length, (e.g., two inches), the wire feeder is stopped and retracted to attempt a second start. After a given number of attempts the system will fault. Thus, excessive wire is not fed with a reduced risk of arcing off the fixture and burning the operator.

Ending a conventional arc welding process often results in a crater and leaves the consumable wire with an unpredictable condition. The dot matrix welding operation can be ended with the wire electrode repeatedly dipped into the molten puddle, pinched, heated with a consistent arcing current portion 314, arc suppressed, then repeated as needed to fill the crater. When the crater is filled, the process is stopped after the last arc suppression. This can leave the end of the wire electrode with a consistent finish or shape/contour.

FIG. 7 illustrates an embodiment of an example controller 142 of the welding power supply 120. The controller 142 includes at least one processor 814 which communicates with a number of peripheral devices via bus subsystem 812. These peripheral devices may include a storage subsystem 824, including, for example, a memory subsystem 828 and a file storage subsystem 826, user interface input devices 822, user interface output devices 820, and a network interface subsystem 816. The input and output devices allow user interaction with the controller 142. The input and output devices can be embodied in the user interface 122 discussed above. Network interface subsystem 816 provides an interface to outside networks and is coupled to corresponding interface devices in other computer systems.

User interface input devices 822 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into the controller 142 or onto a communication network.

User interface output devices 820 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from the controller 142 to the user or to another machine or computer system.

Storage subsystem 824 provides a non-transitory, computer-readable storage medium that stores programming and data constructs that provide the functionality of some or all of the modules described herein. These software modules are generally executed by processor 814 alone or in combination with other processors. Memory 828 used in the storage subsystem can include a number of memories including a main random access memory (RAM) 830 for storage of instructions and data during program execution and a read only memory (ROM) 832 in which fixed instructions are stored. A file storage subsystem 826 can provide persistent storage for program and data files, and may include a hard disk drive, a floppy disk drive along with associated removable media, a CD-ROM drive, an optical drive, flash memory, or removable media cartridges. The modules implementing the functionality of certain embodiments may be stored by file storage subsystem 826 in the storage subsystem 824, or in other machines accessible by the processor(s) 814.

Bus subsystem 812 provides a mechanism for letting the various components and subsystems of the controller 142 communicate with each other as intended. Although bus subsystem 812 is shown schematically as a single bus, alternative embodiments of the bus subsystem may use multiple buses.

Many other configurations of the controller 142 are possible having more or fewer components than the controller depicted in FIG. 7.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A welding or additive manufacturing system, comprising:
    a consumable electrode;
    a torch;
    a wire feeder that selectively feeds the consumable electrode through the torch during a deposition operation; and
    a welding power supply operatively connected to the wire feeder and the torch, wherein the welding power supply is configured to provide a plurality of welding waveforms to the torch to generate a welding current in the consumable electrode,
    wherein each of the plurality of welding waveforms includes a short circuit portion followed by a pinch current portion followed by an arcing current portion, and the short circuit portion is preceded by a first arc suppression portion and the arcing current portion is followed by a second arc suppression portion, wherein an arc exists between the consumable electrode and a workpiece during the arcing current portion, and an air gap without the arc exists between the consumable electrode and the workpiece during the first arc suppression portion and the second arc suppression portion, and
    wherein the welding power supply is configured to detect a short circuit between the consumable electrode and the workpiece and generate the pinch current portion when the short circuit is detected, and the wire feeder both stops feeding of the consumable electrode when the short circuit is detected and restarts feeding of the consumable electrode after the short circuit is cleared without reversing a feeding direction of the consumable electrode through the torch such that a wire feed speed of the wire feeder remains 0 inches per minute from stopping feeding of the consumable electrode when the short circuit is detected until restarting feeding of the consumable electrode after the short circuit is cleared.

2. The welding or additive manufacturing system of claim 1, wherein a duration of the second arc suppression portion is longer than a duration of the arcing current portion.

3. The welding or additive manufacturing system of claim 1, wherein the wire feed speed of the wire feeder increases during the second arc suppression portion.

4. The welding or additive manufacturing system of claim 3, wherein the wire feeder restarts feeding of the consumable electrode during the arcing current portion.

5. The welding or additive manufacturing system of claim 3, wherein the wire feeder restarts feeding of the consumable electrode during the second arc suppression portion.

6. The welding or additive manufacturing system of claim 1, wherein the arcing current portion includes a plurality of current pulses having a frequency of at least 400 Hz.

7. The welding or additive manufacturing system of claim 1, wherein a molten droplet size on the consumable electrode is adjustable based on both of a magnitude and duration of the arcing current portion prior to the second arc suppression portion.

8. The welding or additive manufacturing system of claim 7, wherein a molten droplet transfer frequency is adjustable based on both of the duration of the arcing current portion and a duration of the second arc suppression portion.

9. A welding or additive manufacturing system, comprising:
    a wire electrode;
    a torch;
    a wire feeder that selectively feeds the wire electrode through the torch during a deposition operation; and
    a welding power supply operatively connected to the wire feeder and the torch, wherein the welding power supply is configured to provide a plurality of welding waveforms to the torch to generate a welding current in the wire electrode,
    wherein each of the plurality of welding waveforms includes a short circuit portion followed by a pinch current portion followed by an arcing current portion, and the short circuit portion is preceded by a first arc suppression portion and the arcing current portion is followed by a second arc suppression portion, wherein an arc exists between the wire electrode and a workpiece during the arcing current portion, and an air gap without the arc exists between the wire electrode and the workpiece during the first arc suppression portion and the second arc suppression portion, and
    wherein the welding power supply is configured to detect a short circuit between the wire electrode and the workpiece and generate the pinch current portion when the short circuit is detected, and the wire feeder both stops feeding of the wire electrode during the pinch current portion and restarts feeding of the wire electrode during the second arc suppression portion without reversing a feeding direction of the wire electrode through the torch such that a wire feed speed of the wire feeder remains 0 inches per minute from stopping feeding of the wire electrode during the pinch current portion until restarting feeding of the wire electrode during the second arc suppression portion.

10. The welding or additive manufacturing system of claim 9, wherein a duration of the second arc suppression portion is longer than a duration of the arcing current portion.

11. The welding or additive manufacturing system of claim 9, wherein the wire feed speed of the wire feeder increases during the second arc suppression portion.

12. The welding or additive manufacturing system of claim 9, wherein the arcing current portion includes a plurality of current pulses having a frequency of at least 400 Hz.

13. The welding or additive manufacturing system of claim 9, wherein a molten droplet size on the wire electrode is adjustable based on both of a magnitude and duration of the arcing current portion prior to the second arc suppression portion.

14. The welding or additive manufacturing system of claim 13, wherein a molten droplet transfer frequency is adjustable based on both of the duration of the arcing current portion and a duration of the second arc suppression portion.

15. A welding or additive manufacturing system, comprising:
  a consumable electrode;
  a torch;
  a wire feeder comprising a plurality of drive rolls that selectively feed the consumable electrode through the torch during a deposition operation; and
  a power supply operatively connected to the wire feeder and the torch, wherein the power supply is configured to provide a plurality of welding waveforms to the torch to generate a welding current in the consumable electrode,
  wherein each of the plurality of welding waveforms includes a short circuit portion followed by a pinch current portion followed by an arcing current portion, and the short circuit portion is preceded by a first arc suppression portion and the arcing current portion is followed by a second arc suppression portion, wherein an arc exists between the consumable electrode and a workpiece during the arcing current portion, and an air gap without the arc exists between the consumable electrode and the workpiece during the first arc suppression portion and the second arc suppression portion, and
  wherein the welding power supply is configured to detect a short circuit between the consumable electrode and the workpiece and generate the pinch current portion when the short circuit is detected, and the wire feeder both stops operation of the plurality of drive rolls after the short circuit is detected and restarts operation of the plurality of drive rolls subsequent to the pinch current portion being supplied to the torch without reversing a feeding direction of the consumable electrode through the torch such that a wire feed speed of the wire feeder remains 0 inches per minute from stopping operation of the plurality of drive rolls after the short circuit is detected until restarting operation of the plurality of drive rolls subsequent to the pinch current portion being supplied to the torch.

16. The welding or additive manufacturing system of claim 15, wherein a duration of the second arc suppression portion is longer than a duration of the arcing current portion.

17. The welding or additive manufacturing system of claim 15, wherein the wire feed speed of the wire feeder increases during the second arc suppression portion.

18. The welding or additive manufacturing system of claim 17, wherein the wire feeder restarts feeding of the consumable electrode during the arcing current portion.

19. The welding or additive manufacturing system of claim 17, wherein the wire feeder restarts feeding of the consumable electrode during the second arc suppression portion.

20. The welding or additive manufacturing system of claim 15, wherein the arcing current portion includes a plurality of current pulses having a frequency of at least 400 Hz.

21. The welding or additive manufacturing system of claim 15, wherein a molten droplet size on the consumable electrode is adjustable based on both of a magnitude and duration of the arcing current portion prior to the second arc suppression portion.

22. The welding or additive manufacturing system of claim 21, wherein a molten droplet transfer frequency is adjustable based on both of the duration of the arcing current portion and a duration of the second arc suppression portion.

* * * * *